(12) United States Patent
Burns et al.

(10) Patent No.: US 7,803,324 B2
(45) Date of Patent: Sep. 28, 2010

(54) CATALYST SLURRY FEEDING ASSEMBLY FOR A POLYMERIZATION REACTOR

(75) Inventors: David H. Burns, Houston, TX (US); Donald W. Verser, Houston, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 719 days.

(21) Appl. No.: 11/108,274

(22) Filed: Apr. 18, 2005

(65) Prior Publication Data

US 2005/0186126 A1    Aug. 25, 2005

Related U.S. Application Data

(62) Division of application No. 10/662,264, filed on Sep. 15, 2003, now Pat. No. 6,908,971.

(60) Provisional application No. 60/413,924, filed on Sep. 25, 2002.

(51) Int. Cl.
  *G05D 7/00* (2006.01)
  *B01J 19/00* (2006.01)
  *B01J 19/18* (2006.01)

(52) U.S. Cl. ............ 422/110; 422/131; 422/135; 422/225

(58) Field of Classification Search ............ 422/131, 422/135, 110, 225
See application file for complete search history.

(56) References Cited

U.S. PATENT DOCUMENTS

| | | | |
|---|---|---|---|
| 2,917,465 A * | 12/1959 | Begley | 502/6 |
| 3,110,707 A | 11/1963 | Bua et al. | 526/159 |
| 3,726,648 A | 4/1973 | Weber et al. | 422/134 |
| 5,098,667 A | 3/1992 | Young et al. | 422/111 |
| 6,262,191 B1 | 7/2001 | Hottovy et al. | 526/64 |
| 6,833,415 B2 * | 12/2004 | Kendrick et al. | 526/64 |
| 2002/0137877 A1 | 9/2002 | Debruin | |

* cited by examiner

*Primary Examiner*—William K Cheung
(74) *Attorney, Agent, or Firm*—Fletcher Yoder

(57) ABSTRACT

A catalyst slurry for a polymerization reactor can be prepared in a mixing tank and the catalyst slurry fed to one or more storage tanks. The storage tanks can include agitators so that the catalyst slurry is maintained at an essentially homogeneous solids-to-liquid ratio. From the storage tank(s), the catalyst slurry can be pumped to the polymerization reactor along a fluid passage having a flow meter. The flow of the catalyst slurry can be continuous and/or adjusted based on a measured parameter. The catalyst slurry may be continuously and reliably fed to the polymerization reactor.

21 Claims, 2 Drawing Sheets

CATALYST SLURRY FEEDING ASSEMBLY FOR A POLYMERIZATION REACTOR

RELATED APPLICATIONS

This application is a divisional of application Ser. No. 10/662,264 filed on Sep. 15, 2003, now U.S. Pat. No. 6,908,971 which claims the benefit under 35 U.S.C. §119(e) of U.S. Provisional Application No. 60/413,924 ("the '924 application") filed on Sep. 25, 2002. The '924 application is incorporated by reference herein.

FIELD OF INVENTION

The present process and apparatus relate to preparing and providing a catalyst slurry to a polymerization reactor. More particularly, the present process and apparatus provide techniques for continuously and reliably feeding a catalyst slurry to a loop polymerization reactor.

BACKGROUND OF THE INVENTION

Polyolefins such as polyethylene and polypropylene may be prepared by particle form polymerization, also referred to as slurry polymerization. In this technique, feed materials such as monomer, catalyst and diluent are introduced to a polymerization reactor, for example, a loop reactor, and an intermediate product slurry containing solid polyolefin particles in a liquid medium is withdrawn or taken off.

In continuous loop reactors, the various feed materials may be introduced to the loop reaction zone in various ways. For example, the monomer and catalyst may be mixed with varying amounts of diluent prior to introduction to the reaction zone. In the loop reaction zone, the monomer and catalyst become dispersed in the fluid slurry. As they circulate through the loop reaction zone in the fluid slurry, the monomer reacts at the catalyst site in a polymerization reaction. The polymerization reaction yields solid polyolefin particles in the fluid slurry.

A catalyst is provided to the polymerization reactor to catalyze the polymerization process. In conventional polyethylene loop reaction processes, the dry, solid catalyst is combined with olefin-free diluent in an unagitated vessel known as a mud chamber. The catalyst settles within the diluent to form a catalyst mud. After the catalyst mud is prepared, it is then fed into a lead-in pipe by a ball-check feeder located at the bottom of the catalyst mud chamber. The lead-in pipe then feeds the catalyst mud (or catalyst slurry if it has been sufficiently agitated) to the loop reactor.

The ball-check feeder discharges the catalyst mud from the catalyst mud chamber in an intermittent fashion. The ball-check feeder includes a cylinder attached to a rotating cam. The cylinder has an open top end and contains a ball that slides up and down within the cylinder. In operation, the cylinder is upright with the top end under the catalyst mud chamber and the ball positioned near the top end. The catalyst mud chamber pours catalyst mud into the cylinder through the top end with such force that the ball is pushed down toward a bottom end of the cylinder, and the catalyst mud fills the cylinder above the ball. The cam arm then rotates the cylinder such that the top end of the cylinder faces downward and is aligned above the lead-in pipe. The catalyst mud then pours out of the cylinder into the lead-in pipe, and the ball falls back into position near the top end of the cylinder. The cam arm then rotates the cylinder back such that the top end of the cylinder is again beneath the catalyst mud chamber to receive more catalyst mud. Thus, the catalyst mud is fed into the loop reactor in a series of discrete loads.

The ball-check feeder and the catalyst mud chamber suffer from several drawbacks. First, the amount of catalyst mud delivered by the ball-check feeder may vary with each rotation. For example, the cylinder may be only half-filled with catalyst slurry from the catalyst mud chamber. At other times, the cylinder may receive mainly liquid diluent, with very little catalyst from the catalyst mud chamber. Also, if the ball-check feeder is not properly sealed, the pressure differential between the catalyst mud chamber and the reactor can cause catalyst to bypass the ball-check feeder and go into the reactor, which may lead to an excessive amount of catalyst being fed into the reactor. The lack of consistency in the delivery of the catalyst mud can make it difficult to determine how much catalyst is being fed into the loop reactor at any given time. Therefore, an operator using the ball-check feeder cannot, in the regular course of operation, accurately monitor the amount of catalyst being delivered to the reactor.

The catalyst feed rate may be inferred by the number of times the catalyst is dumped out of the ball-check feeder per unit of time. However, because of the inconsistency in the amounts of catalyst in each dump (as discussed above), this method can be inaccurate. Also, if the operators reduce or increase the amount of catalyst being fed into the reactor by changing the speed of the feeder, the change in the speed of the feeder is generally not reliably proportional to the catalyst feed rate. The catalyst feed rate may also be inferred by the amount of polymerization that takes place in the reactor. However, such a method occurs after too much or too little catalyst has already been fed into the reactor. Too much or too little catalyst mud fed into the loop reactor may adversely affect the polymerization process. Therefore, the inconsistency and unpredictability of the ball-check feeder and catalyst mud chamber increase the possibility that the polymerization process in the loop reactor will not be performed under desired conditions.

Another problem with the ball-check feeder is that the settled catalyst mud generally does not have a homogeneous catalyst-to-diluent weight ratio. Since the catalyst mud chamber does not agitate the catalyst slurry/diluent mixture, the catalyst settles within the mixture to form a layer of catalyst mud beneath a layer of diluent. This catalyst mud layer has a greater concentration of catalyst at the bottom than at the top. Therefore, the concentration of the catalyst mud fed into the reactor is greater when the mud chamber is first activated, and the concentration decreases as the mud chamber empties. Non-homogeneous catalyst slurry may lead to too much or too little catalyst being fed into the loop reactor, which again may adversely affect the polymerization process. Also, the ball-check feeder may leak catalyst slurry into the lead-in pipe between rotations, so extra catalyst slurry may at times be fed into the loop reactor.

Other apparatuses and processes have been developed to deliver catalyst to a polymerization reactor. However, there remains a desire for a system that continuously and reliably delivers catalyst slurry to a loop reactor.

SUMMARY OF THE INVENTION

The present invention provides an improved apparatus for preparing and feeding a catalyst slurry to a polymerization reactor. The apparatus has a mixing tank for forming a catalyst slurry from a solid catalyst and a liquid medium, and a storage tank for maintaining the catalyst slurry. The storage tank is fluidly connected to and receives the catalyst slurry from the mixing tank. (The storage tank is sometimes referred to as a run tank). The apparatus can also include a pump for delivering the catalyst slurry to the polymerization reactor by a fluid passage and a flow meter disposed along the fluid passage. The flow meter can measure the flow of the catalyst slurry in the fluid passage. The apparatus can also include a controller that receives a flow signal from the flow meter indicative of the flow of the catalyst slurry. The controller may direct the pump to increase or decrease the flow of the catalyst slurry into the polymerization reactor based on the flow signal.

The apparatus may include a mixing tank and/or a storage tank that each have an agitator, such as an impeller or other mixing device, for agitating the catalyst slurry such that the catalyst slurry has an essentially homogeneous solid-to-liquid weight ratio, meaning that it is homogeneous or with small variations that have no significant effect on the polymerization process. The mixing tank can be at a higher elevation than the storage tank, so that the catalyst slurry flows from the mixing tank to the storage tank at least partially due to gravity, thereby avoiding the necessity of a pump between the mixing tank and the storage tank. Alternatively, the catalyst slurry can be moved between the tanks without a pump or a difference in elevation by maintaining a pressure differential between the mixing tank and the storage tank. The apparatus may include at least one additional storage tank that is fluidly connected to receive the catalyst slurry from the mixing tank and is fluidly connected to provide the catalyst slurry to the polymerization reactor.

The present invention also provides an improved apparatus for monitoring and feeding a catalyst slurry to a polymerization reactor. The apparatus includes a storage tank (run tank) and/or mixing tank, each having an agitator to agitate the catalyst slurry. The catalyst slurry can be maintained at an essentially homogeneous solids-to-liquid ratio. The catalyst slurry is essentially homogeneous when the variations are sufficiently small so as to have no significant effect on the polymerization process. The apparatus can also include a pump, a flow meter and a controller. The pump delivers the catalyst slurry from the storage tank to the polymerization reactor by a fluid passage. The flow meter is disposed along the fluid passage and measures the flow of the catalyst slurry into the polymerization reactor. The controller receives a signal indicating the measured flow from the flow meter and signals the pump to adjust the flow of the catalyst slurry into the polymerization reactor. The controller may calculate the amount of catalyst fed to the reactor and signal the pump based on the calculated amount. The apparatus may also include a liquid feed fluidly connected to the fluid pump, such that the pump is capable of supplying liquid (such as catalyst-free diluent) rather than the catalyst slurry.

The present invention also provides an improved apparatus for preparing and continuously feeding a catalyst slurry to a polymerization reactor. The apparatus includes a first slurry storage tank having an agitator for agitating the catalyst slurry, and a level indicator that detects the level of the catalyst slurry in the tank. The apparatus can also include a second slurry storage tank, which also may have an agitator and a level indicator. The apparatus also includes a pump to receive the catalyst slurry from at least one of the storage tanks and deliver the catalyst slurry to a polymerization reactor. In this way, the controller can make the catalyst slurry continuously available from one storage tank or the other. For example, the second storage tank may serve as a spare or transition tank. The second storage tank may be used when the first storage tank is malfunctioning or when a new catalyst type needs to be introduced to the reactor. Alternatively, a controller may receive signals from the level indicators to determine which storage tank should provide the catalyst slurry to the reactor. As another alternative, a mixing tank may be provided before the storage tanks for mixing the catalyst slurry. The controller may also determine which storage tank has an insufficient level of slurry and should receive additional slurry from the mixing tank. Alternatively, two mixing tanks may be provided which pump the catalyst slurry directly to the reactor. Thus, one of the mixing tanks serves as a storage tank and the controller switches between the mixing tanks when one becomes empty.

The apparatus can also include a fluid passage that extends from the pump to the polymerization reactor and a flow meter disposed on the fluid passage that measures the flow of the catalyst slurry into the polymerization reactor. The controller can receive a signal indicating the measured flow from the flow meter and signal the pump to adjust the flow of the catalyst slurry into the polymerization reactor.

The foregoing catalyst slurry apparatus may be employed as part of a polymerization apparatus and may be used to feed the catalyst slurry to the catalyst feeds of a slurry polymerization reactor.

The present invention also provides a process for preparing a catalyst slurry and providing the catalyst slurry to a polymerization reactor. The process includes forming a catalyst slurry from a dry catalyst and a liquid medium, maintaining the catalyst slurry at an essentially homogeneous solid-to-liquid ratio, pumping the catalyst slurry into a polymerization reactor, measuring the flow of the catalyst slurry pumped into the reactor, and altering the flow of the catalyst slurry fed into the polymerization reactor at least partially in response to the measured flow. The process can also include continuously agitating the catalyst slurry to maintain the catalyst slurry at an essentially homogeneous solid-to-liquid ratio, and continuously pumping the catalyst slurry or a liquid medium into the reactor. The feed to the pump may be automatically switched to provide liquid medium to the reactor in place of the catalyst slurry.

The process may also include determining the amount of the catalyst fed to the polymerization reactor over a selected period. An operator can determine the catalyst feed rate by using a flow meter as mentioned above. Additionally or alternatively, an operator may determine catalyst feed rate by measuring the loss of the slurry level in the storage tank, converting the level change to a mass change, and then dividing the mass amount by the time interval to arrive at a calculated feed rate. The calculated feed rate can then be used to alter the flow of the catalyst slurry into the reactor at least partially in response to the calculated amount. The process may also include introducing a dry catalyst and a liquid diluent into a mixing tank to form a catalyst slurry, agitating the catalyst slurry in the mixing tank to maintain a homogeneous solids-to-liquid ratio, feeding the catalyst slurry from the mixing tank to a storage tank, continuously agitating the catalyst slurry in the storage tank so as to maintain the catalyst slurry at an essentially homogeneous solids-to-liquid ratio, continuously feeding the catalyst slurry from the storage tank to a pump, and/or continuously pumping the catalyst slurry into the polymerization reactor. The process may also include operating the polymerization reactor so as to produce solid polymer particles.

The process may also comprise monitoring the amount of the catalyst slurry pumped into the polymerization reactor, and altering the flow rate of the catalyst slurry pumped into the polymerization reactor in response to the monitored amount. The amount may be continuously monitored and the flow rate may be continuously altered. The process may also include agitating the catalyst slurry with impellers in the mixing tank to maintain the catalyst slurry at an essentially homogeneous solid-to-liquid ratio.

The present invention also relates to an improved process for continuously feeding catalyst slurry to a polymerization reactor. The process includes preparing a catalyst slurry of solid catalyst and a liquid medium, maintaining the catalyst slurry in a plurality of tanks at an essentially homogeneous solids-to-liquid ratio, and continuously pumping the catalyst slurry from a first one of the tanks into the reactor. The process may also include detecting the amount of catalyst slurry in the first tank, and automatically switching to a second one of the tanks when the amount in the first tank is at a predetermined level. Additionally or alternatively, the process may include simultaneously introducing the catalyst slurry from the plurality of tanks at a plurality of locations along the polymerization reactor.

DETAILED DESCRIPTION OF THE INVENTION

The processes and apparatus are particularly applicable to olefin polymerizations in a liquid medium. Suitable olefin monomers are 1-olefins having up to 8 carbon atoms per molecule and no branching nearer the double bond than the 4-position. The present processes and apparatus may be used with a loop reactor for the copolymerization of ethylene and a higher 1-olefin such as butene, 1-pentene, 1-hexene, 1-octene and 1-decene. For example, the present processes and apparatus may be used to polymerize ethylene and 0.01 to 10 weight percent higher-olefin, alternatively 0.01 to 5 weight percent higher-olefin, alternatively 0.1 to 4 weight percent higher 1-olefin, based on the total weight of ethylene and comonomer. Alternatively sufficient comonomer can be used to give the above-described amounts of comonomer incorporation in the polymer.

The liquid medium may be a diluent for the solid polymer particles that is separate from and in addition to the unreacted monomers. Suitable diluents for the present processes are well known in the art and include hydrocarbons which are inert and liquid or are super critical fluids under slurry polymerization conditions. Suitable hydrocarbons include isobutane, propane, n-pentane, i-pentane, neopentane and n-hexane, with isobutane being especially preferred. Alternatively, the liquid medium may be the unreacted monomer itself. For example, the present processes and apparatus may also be adapted to propylene polymerization in loop reactors. In the case of bulk polymerization of propylene, there is no separate diluent with respect to the monomer, because the monomer (propylene) serves as the liquid medium. Of course, the concentration of the olefin monomer will be much higher than when a liquid diluent is also present. However, a liquid medium that is a diluent for the catalyst will be used for catalyst slurry preparation in the present process and apparatus. Also, in the case of propylene polymerization, the comonomer can be ethylene and/or another comonomer.

In polyethylene polymerizations using a loop reactor, the diluent is typically recycled after being separated from the solid polymer. Recycled diluent that has been processed to be olefin-free can be combined with a dry catalyst to form a catalyst slurry. Alternatively, fresh (olefin-free) diluent can be used to form a catalyst slurry. The catalyst slurry is introduced into the loop reactor to catalyze the polymerization process.

Figure 1:
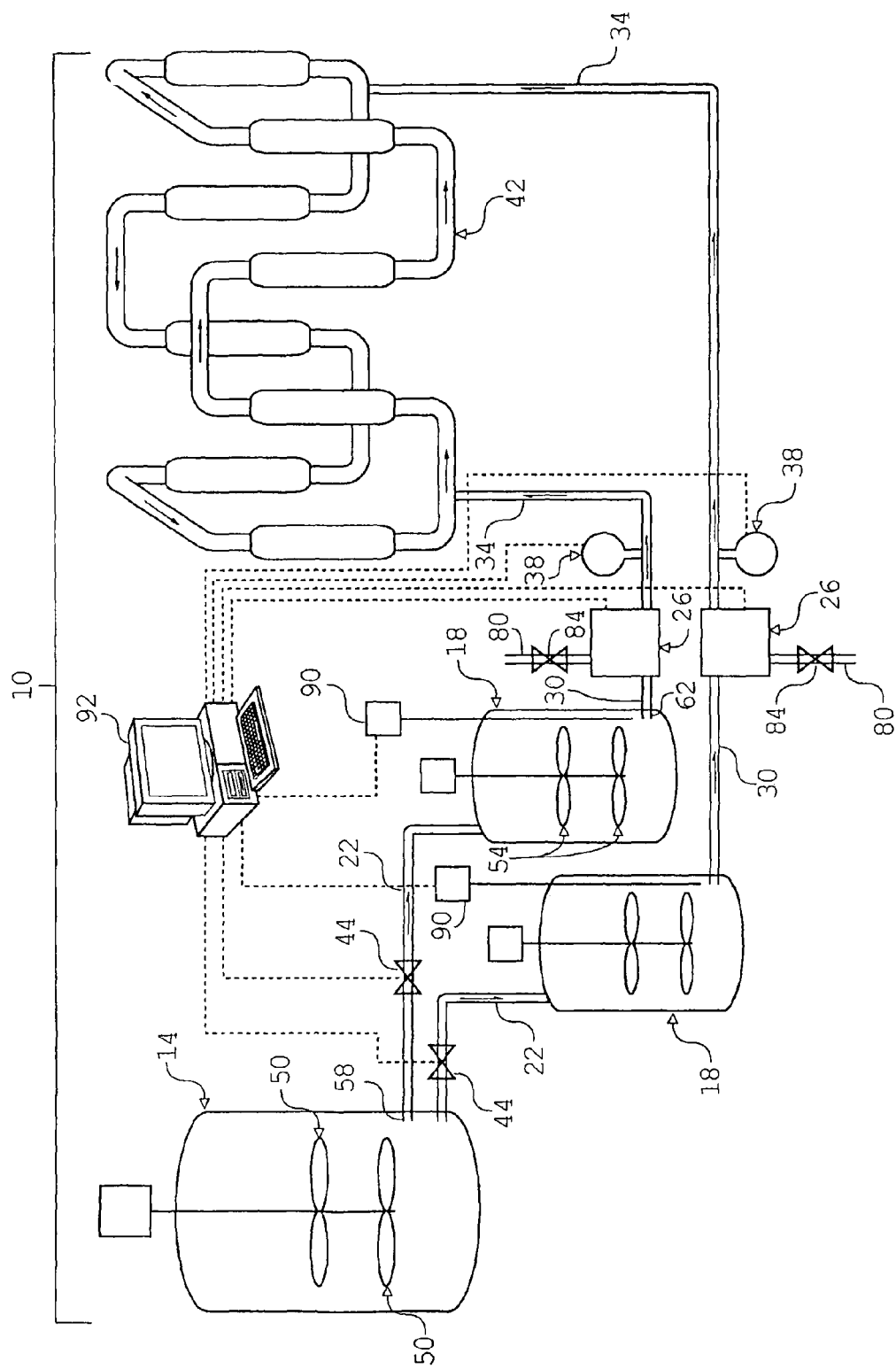
FIG. 1 illustrates an improved catalyst slurry feeding assembly.

FIG. 1 illustrates a polymerization apparatus 10 including a catalyst slurry feeding assembly as an example of the present invention. FIG. 1 is not drawn to scale; certain elements are enlarged for clarity of illustration. In FIG. 1, the polymerization apparatus 10 includes a mixing tank 14 where a batch of catalyst is mixed with diluent to prepare catalyst slurry for a polymerization reactor 42. By way of example (but not as a limitation) the polymerization reactor may be a loop reactor. The mixing tank 14 is fluidly connected to storage tanks (or run tanks) 18 by first conduits 22. The first conduits 22 may have valves 44. The storage tanks 18 are each fluidly connected to a pump 26 by a second conduit 30 and each pump 26 is in turn fluidly connected to the polymerization reactor 42 by a lead-in pipe 34 which is a fluid passage to the reactor 42. The lead-in pipes 34 are operatively connected with flow meters 38 disposed along the lead-in pipe 34 located between the pumps 26 and the polymerization reactor 42. The mixing tank 14 receives dry catalyst and olefin-free diluent as the liquid medium. By way of example only, the mixing tank 14 has a capacity of 4,500 gallons.

Suitable catalysts for slurry olefin polymerizations are well known in the art. Particularly suitable is chromium oxide on a support such as silica. Reference herein to silica supports is meant to also encompass any known silica containing support including but not limited to silica-alumina, silica-titania and silica-alumina-titania. Ziegler catalysts, metallocenes, and other well-known polyolefin catalysts, as well as co-catalysts, may be used. Additionally, suitable diluents for such catalysts are well known in the art. Suitable hydrocarbons include isobutane, n-butane, propane, n-pentane, i-pentane, neopentane, n-hexane, and n-heptane. The catalyst and diluent are added into the mixing tank 14 in such proportions necessary to achieve a desired weight percent catalyst in diluent. By way of example only, the catalyst and diluent are added into the mixing tank 14 in such proportions that the resulting mixture is approximately 8 weight percent catalyst in diluent.

The mixing tank 14 is typically larger than the storage tanks 18 and is used to make large batches of catalyst slurry. The mixing tank 14 includes an agitator 50 that agitates the catalyst slurry. In FIG. 1, the agitator 50 is an impeller. The impellers 50 may have different sizes and shapes. The impellers 50 can maintain the catalyst slurry at an essentially homogeneous catalyst-to-diluent weight ratio (or solid-to-liquid weight ratio) throughout the mixing tank 14. Creating a homogeneous batch of catalyst slurry in the mixing tank 14 after the catalyst is added to the diluent may take only seconds, but filling the mixing tank 14 with diluent may take some time, for example, one hour. By way of example only, the mixing tank 14 may be sized to hold a 600 kilogram batch of catalyst, which will be sufficient to feed the reactor for approximately 30 to 40 hours.

The first conduits 22 extend out of the mixing tank 14 and deliver the catalyst slurry to the storage tanks 18. The first conduits 22 can have inlets 58 that are positioned near the bottom of the mixing tank 14 such that the first conduits 22 can still draw catalyst slurry out of the mixing tank 14 when the level of the catalyst slurry is low within the mixing tank 14. The impellers may be located proximate the bottom tangent of the mixing tank 14 to produce a homogeneous catalyst slurry even at low tank levels. Also, the inlets 58 of the first conduits 22 may be located at points in the mixing tank 14 proximate an impeller 50 in order that the first conduits 22 draw catalyst slurry that is essentially homogeneous. The catalyst slurry in the mixing tank 14 may be subject to a higher pressure or may be located at a higher elevation than the catalyst slurry in the storage tanks 18 such that the catalyst slurry is pushed from the mixing tank 14 to the storage tanks 18 through the first conduits 22.

Each first conduit 22 carries catalyst slurry past a valve 44 to a storage tank 18. By way of example only, the storage tanks 18 each have a capacity of 1,250 gallons. While the mixing tank 14 is in the process of creating a batch of catalyst slurry, the valve 44 may be closed so that no catalyst slurry flows from the mixing tank 14 to the storage tank 18. The storage tank 18 can include a level indicator 90 that is electrically connected to the valve 44 (via a computer or other controller) and measures the level of the catalyst slurry in the storage tank 18. When the level of the catalyst slurry 14 in the storage tank 18 is low, the level indicator 90 may signal the valve 44 to open the first conduit 22. The catalyst slurry then flows into the storage tank 18 until the storage tank 18 contains a desired level of catalyst slurry. The level indicator 90 may then signal the valve 44 to close the first conduit such that no more catalyst slurry enters the storage tank 18. Therefore, between batch mixings of catalyst slurry in the mixing tank 14, a large enough batch of catalyst slurry can be drawn from the mixing tank 14 to the storage tank 18 such that the storage tank 18 will not run out of catalyst slurry during the time (for example, from 4 to 6 hours) when the mixing tank 14 is making a new batch of catalyst slurry.

Once the storage tanks 18 have received a batch of catalyst slurry from the mixing tank 14, the storage tanks 18 may agitate the catalyst slurry with impellers 54 similar to those used in the mixing tank 14 or with other means for agitating. The impeller 54 may be employed to constantly agitate the catalyst slurry such that the catalyst slurry has an essentially homogeneous catalyst-to-diluent weight ratio (or solid-to-liquid weight ratio) throughout the storage tank 18.

The second conduits 30 extend out of the storage tanks 18 and deliver a continuous flow of the catalyst slurry to the pumps 26. Each second conduit 30 can have an inlet 62 that is positioned near the bottom of a storage tank 18 such that the second conduit 30 can still draw catalyst slurry out of the storage tank 18 when the level of the catalyst slurry within the storage tank 18 is low. The impellers 54 may be located proximate the bottom tangent of the storage tank 18 to produce an essentially homogeneous catalyst slurry even at low tank levels. Also, the inlet 62 of each second conduit 30 may be located at a point in the storage tank 18 proximate an impeller 54 in order that the second conduit 30 draws catalyst slurry from the storage tanks 18 that is thoroughly homogenized.

The second conduits 30 permit a continuous flow of the catalyst slurry to the pumps 26 which elevate the pressure on the catalyst slurry and push the catalyst slurry into the polymerization reactor 42 through the lead-in pipes 34. The pumps 26 may be positive displacement pumps with, by way of example, three heads or may be another type of fluid pump. In three-head pumps, each head has a plunger connected to a piston that pushes the catalyst slurry forward toward the polymerization reactor 42. When the piston retracts after pushing the plunger (and thus the catalyst slurry) toward the polymerization reactor 42, the piston retracts such that the pressure is reduced and the flow of the catalyst slurry in the head is reduced. However, with three heads working at once in the same pump 26, at least one piston is pushing the catalyst slurry toward the polymerization reactor 42 essentially all the time such that the retraction and pressure loss of the other pistons does not interrupt the nearly continuous pressure on and flow of the catalyst slurry through the pump 26. By pumping the catalyst flow continuously, the pump 26 is less likely to create and be plugged up by gas pockets in the catalyst slurry.

When the pumps 26 provide the catalyst slurry to the polymerization reactor 42 in a substantially continuous flow, the flow meters 38 may be used to measure the flow of catalyst slurry entering the lead-in pipes 34. Alternatively, the flow meters 38 may be used to measure the less continuous flow of catalyst slurry generated by a pump having a single head (or any type of pump). Alternatively or additionally, the flow meters 38 may be used to measure the catalyst concentration within the catalyst slurry. The flow meters 38 preferably are coriolis type mass flow meters, though any suitable flow measuring means able to measure the flow of the catalyst slurry itself or the flow of the catalyst within the slurry as the catalyst slurry passes the flow meters 38 may be used.

A desired amount of catalyst slurry is fed to the polymerization reactor 42 to effectively aid the polymerization process. The flow meters 38 are electrically connected to a controller, for example a computer or distributed control system (DCS) 92, and to the pumps 26 such that when the flow or amount of catalyst slurry flowing through the flow meters 38 exceeds the desired amount, the controller 92 signals the pumps 26 to reduce or stop the flow or amount of catalyst slurry into the polymerization reactor 42. The controller 92 may calculate the amount of catalyst fed to the reactor over a selected time, for example, based on the measured flow and the concentration of catalyst in the catalyst slurry.

Alternatively, the controller 92 may signal the pumps 26 to increase or restart the flow of the catalyst slurry into the polymerization reactor 42 when the flow or amount of catalyst slurry flowing past the flow meters 38 is not enough to meet the predetermined or calculated amount of catalyst required in the polymerization reactor 42. Thus, the catalyst feeding assembly can provide a continuous flow of catalyst slurry to the polymerization reactor 42 that can be measured by the flow meters 38 and reduced, stopped, increased or started by the flow meters 38 and the pumps 26. Alternatively, the valves 32 on supply lines 30 can be opened or closed (wholly or partially) to reduce, stop, increase, or start the flow of slurry into the polymerization reactor 42.

Alternatively, the controller 92 may measure the amount of the catalyst slurry fed into the polymerization reactor 42 over a selected period of time. The controller 92 can measure the loss in catalyst slurry level in the storage tank 18, convert the level change to a mass change and then divide the mass change by the time interval to arrive at a calculated feed rate. The calculated feed rate can then be compared to a predetermined catalyst slurry rate necessary for a specified polymer production amount. The controller 92 can then alter the flow of the catalyst slurry into the polymerization reactor 42 accordingly. This calculated method is a backup to the flow meters 38 that improves the reliability of the catalyst slurry feed system.

Alternatively, the controller 92 may measure the amount of catalyst slurry in a storage tank 18 with the level indicator 90 and signal the valve 44 to open such that the storage tank 18 is re-supplied with catalyst slurry from the mixing tank 14.

A reactor may have only one catalyst feed or, alternatively, may have a plurality of catalyst feeds spaced about a polymerization reactor so as to facilitate even distribution of catalyst in the fluid slurry. For example, in FIG. 1, the two lead-in pipes 34 are symmetrically arranged around the reactor to facilitate even catalyst distribution in the fluid slurry. Additionally, based on the readings of the flow meters 38, the controller 92 may calculate how often a new batch of catalyst slurry is to be made and how much slurry is to be made in the batch. Alternatively, the lead-in pipes 34 can both feed into the same point on the polymerization reactor 42.

The use of the mixing tank 14 with the storage tank(s) 18 efficiently separates the tasks of preparing the catalyst slurry and delivering the catalyst slurry in a continuous flow. The mixing tank 14 mixes the catalyst slurry into a homogeneous state. The storage tank 18 is filled with enough catalyst slurry to continuously deliver catalyst slurry for a desired length of time. Therefore, the mixing tank 14 and the storage tank 18 each perform a discrete task to ensure that the polymerization reactor 42 is continuously fed with catalyst slurry.

However, for some systems, a slurry feeding assembly may include two run tanks and does not include separate mixing and storage tanks. In those systems, the run tanks will generally be larger than the storage tanks of systems that include a mixing tank, because each run tank will be used to mix large batches of catalyst slurry as the mixing tank 14 does. In these systems, while the first run tank mixes a new batch of catalyst slurry, the second run tank continuously delivers a flow of catalyst slurry to the polymerization reactor 42. When the first run tank has finished making a new batch of catalyst slurry and the second run tank has delivered most or all of its catalyst slurry to the polymerization reactor 42, the first run tank then begins to deliver a continuous flow of catalyst slurry to the polymerization reactor 42 while the second run tank begins to mix a new batch of catalyst slurry. The two run tanks thus alternate in mixing and delivering the catalyst slurry to ensure that a continuous flow of catalyst slurry is provided to the polymerization reactor 42. However, by using parallel run tanks to perform both the mixing and delivery tasks, the catalyst slurry feeding assembly, to a certain extent, loses the benefit of a second line with a backup pump as explained below. Therefore, a two-run tank system may have two pumps and two separate lines in order to have redundant capacity.

The catalyst slurry feeding assembly can operate with either one or both of the second conduits 30 running. If the pumps 26 are constantly running, they may tend to wear and break down more frequently. Therefore, a redundant or backup pump is desirable for a catalyst slurry feeding assembly. One way to use a back-up pump is to use only one feed line with a contingency pipe that diverts the catalyst slurry from the second conduit 30 to the back-up pump and then back to the feed line at the lead-in pipe 34. When the main pump in the single feed line 26 breaks down, the catalyst slurry may be fed to the back-up pump through the contingency pipe with little time or production loss. However, because the contingency pipe diverges and remerges with the feed line, it contains extra bends and elbows. Thus, the solids in the catalyst slurry are more likely to plug up the contingency pipe and reduce the flow of the catalyst slurry. The back-up pump may be incorporated into the catalyst slurry feed assembly by using an entirely separate second feed line so that if one pump 26 breaks down and cripples one line, the second pump 26 in the second line can operate to deliver catalyst slurry with less time and production loss.

Alternatively or additionally, for certain polymerization processes, two or more types of catalyst are used. For example, one type of catalyst can be mixed in the mixing tank 14 to form a first catalyst slurry, which is then fed into a first storage tank 18. A second type of catalyst may be mixed in the mixing tank 14 to form a second catalyst slurry, which is then fed into a second storage tank 18, or, alternatively, the second type of catalyst may be mixed in a second mixing tank 14 and fed into the second storage tank 18. The first storage tank 18 feeds the first catalyst slurry into the polymerization reactor 42, and the second storage tank 18 then feeds the second catalyst slurry into the polymerization reactor 42. Additionally, the slurry feeding assembly may have only one feed line or have more than two feed lines. Alternatively, both types of catalyst may be fed into the polymerization reactor 42 simultaneously from the first and second storage tanks 18.

The catalyst slurry feeding assembly provides several advantages. First, the slurry feeding assembly provides a predictable, controllable and continuous flow of catalyst slurry to the polymerization reactor 42. The catalyst slurry fed to the reactor may be monitored and maintained at a specified percentage, for example, about 8 weight %. By continuously providing (feeding) catalyst slurry to the polymerization reactor 42 instead of introducing discrete amounts of catalyst slurry in pulses or batches or other discontinuous fashions, the flow meters 38 can better monitor and reduce or increase the flow of the catalyst slurry as desired to deliver the appropriate amount of catalyst slurry to the polymerization reactor 42. The monitoring system can also allow operators to know how much catalyst slurry has been added to the reactor and to calculate how much catalyst slurry is in the reactor. The catalyst slurry feeding assembly can also reduce or eliminate unpredictable leakage of catalyst slurry into the lead-in pipes 34 because the catalyst slurry is stored at low pressure and is pumped into the reactor. Thus, the chance of too much catalyst slurry being added to the polymerization process is reduced. Additionally, the use of impellers 54 in the storage tanks 18 facilitates maintaining the catalyst slurry at an essentially homogeneous catalyst-to-diluent weight ratio prior to being pumped into the polymerization reactor 42. When the catalyst slurry is essentially homogeneous, the chance of too much or too little catalyst being added to the polymerization process is reduced. Thus, the catalyst slurry feeding assembly results in a more consistent and stable reaction rate.

Figure 2:
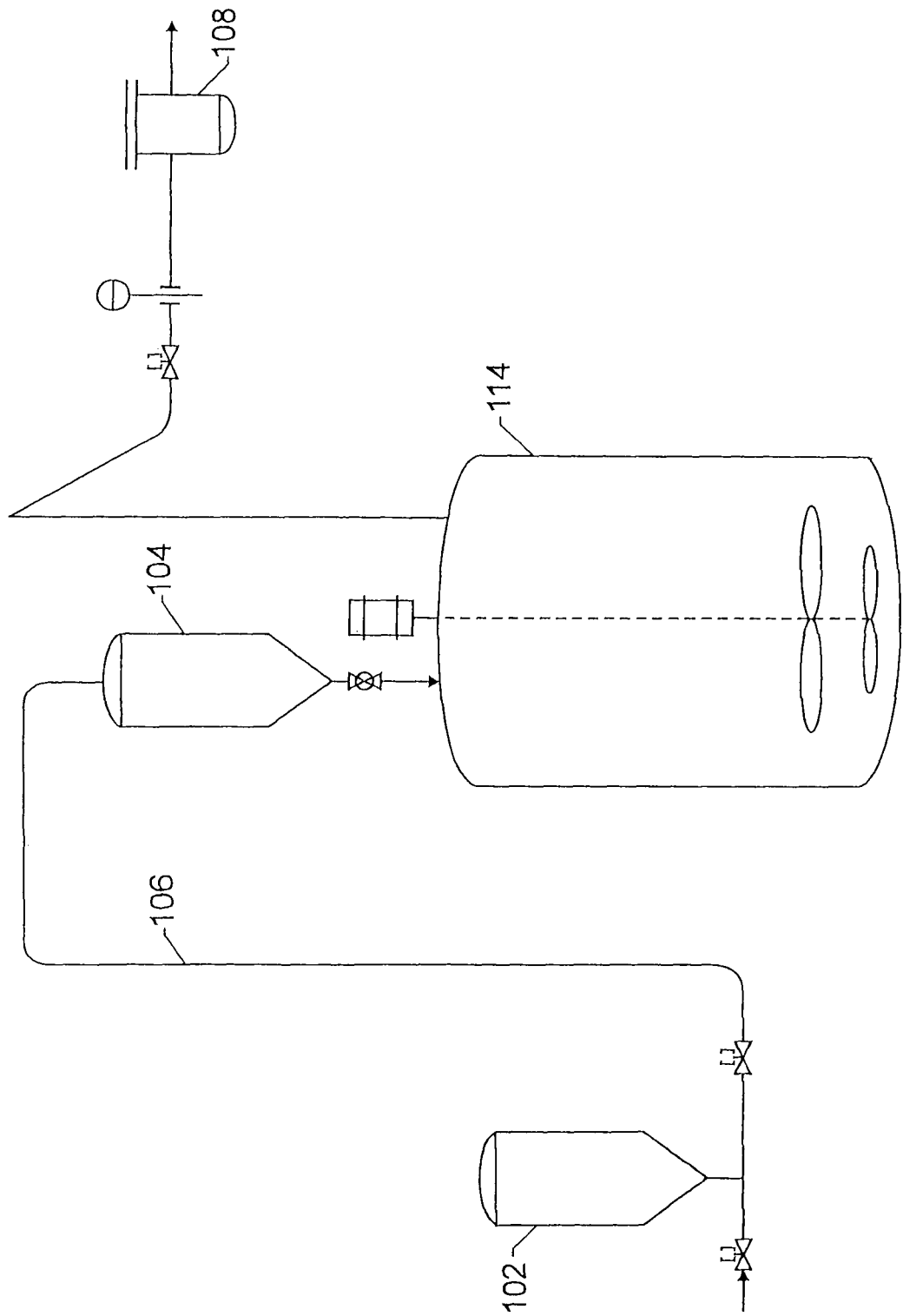
FIG. 2 illustrates an apparatus and method for the transport of catalyst into and out of a catalyst mixing tank.

FIG. 2 illustrates an apparatus and process for the transport of a catalyst into and out of a mixing tank, such as the mixing tank 14 shown in FIG. 1. In FIG. 2, catalyst is initially brought into a polymerization plant and into a catalyst transport vessel 102. The catalyst is transported from the catalyst transport vessel 102 into a catalyst weigh tank 104 via a transport line 106. The catalyst weigh tank 104 is an elevated vessel, so that the catalyst can flow by gravity into the catalyst mixing tank 114. Alternatively, the catalyst could be transferred from the catalyst transport vessel 102 to a traditional catalyst mudpot for direct feeding to a reactor.

In FIG. 2, a pneumatic transport system is used to transfer the catalyst from the catalyst transport vessel 102 to the catalyst weigh tank 104. A filter 108 may be provided to remove catalyst. A cyclone (not shown) may optionally be provided instead of or in addition to the filter, though it is presently preferred to omit such a cyclone for simplicity.

The pneumatic transport system uses a dense phase transfer with a relatively high solids to gas ratio. The catalyst transport vessel 102 is pressured with nitrogen. The catalyst weigh tank 104 (or catalyst mudpot) is isolated from the filter 108 at a low pressure. The pressure source is isolated from the catalyst transport vessel 102, then the pressured catalyst transport vessel 102 is equalized with the catalyst weigh tank 104 by opening a automated block valve between the two vessels. As the pressures equalize between the two vessels, the catalyst is carried up into the destination vessel (for example, the catalyst weigh tank 104). After the pressure is equalized (in other words, the two vessels have equal pressure), the line from the catalyst weigh tank 104 (or catalyst mudpot) is vented through a restrictive orifice to the filters. These steps are repeated several times to assure all catalyst is removed from the catalyst transport vessel 102.

The advantages of the pneumatic transport system include the ability to transfer catalyst from the catalyst transport vessel to the catalyst weigh tank very quickly and at a high solids to gas ratio. Also the catalyst is fully transported leaving minimal amounts in the catalyst transport vessel thereby reducing or minimizing the loss of catalyst. Additionally, this transport system has lower catalyst carryover to the filters, which reduces the amount of lost catalyst. Also catalyst is transferred without damaging the catalyst particles by breakage causing fines (which are small catalyst particles).

The foregoing processes and apparatus also confer several unexpected benefits. First, using the catalyst slurry feeding assembly with the polymerization reactor can facilitate higher polymerization solids production because of a consistent and controllable feeding of catalyst into the polymerization reactor and thus a more consistent process throughout the entire polymerization reactor. The catalyst slurry feeding assembly can also provide improved product quality by improving the measurement and control of the amount of catalyst fed into the polymerization reactor and thus improving control of the reactor. Also, the use of the catalyst slurry feeding assembly can contribute to reliability in the operation of the polymerization reactor because catalyst fed into the polymerization reactor is monitored to prevent excess catalyst from entering the polymerization reactor and inducing an adverse reaction. For example, the use of the valves, flow meters, and pumps in the slurry feeding assembly reduces the chance of extra catalyst inadvertently leaking into the polymerization reactor.

The catalyst is also maintained in the catalyst slurry feeding assembly at a lower pressure than in the reactor. Should any leaks occur in the catalyst slurry feeding assembly, the catalyst would not flow into the reactor because the reactor is more highly pressurized than the catalyst feed vessels. Thus, the chance that excess catalyst is inadvertently added to the reactor by equipment malfunctions (such as the valve leaks and incorrect valve arrangements that were common with use of the ball-check feeder) is reduced.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

We claim:

1. An apparatus for preparing, measuring, and feeding a catalyst slurry to a polymerization reactor, wherein the apparatus comprises:
   a mixing tank for mixing a catalyst slurry comprising a solid catalyst in a liquid medium, wherein the mixing tank comprises an agitator;
   a storage tank for maintaining the catalyst slurry, wherein the storage tank is fluidly connected to receive the catalyst slurry from the mixing tank;
   a pump for delivering the catalyst slurry from the storage tank to a polymerization reactor through a fluid passage;
   a flow meter adapted to measure the flow of the catalyst slurry through the fluid passage; and
   a controller that receives a flow signal from the flow meter indicative of the flow of the catalyst slurry, wherein the controller directs the pump to adjust the flow of the catalyst slurry based on the flow signal.

2. The apparatus of claim 1, wherein the storage tank includes at least one agitator.

3. The apparatus of claim 1, wherein the mixing tank is at a higher elevation than the storage tank so that the catalyst slurry flows from the mixing tank to the storage tank at least partially due to gravity.

4. The apparatus of claim 1, wherein the catalyst slurry flows from the mixing tank to the storage tank due to a pressure differential between the mixing tank and the storage tank.

5. The apparatus of claim 1, further comprising a level indicator for measuring the level of catalyst slurry in the storage tank, wherein the controller is adapted to receive a signal indicative of the measured level of the catalyst slurry in the storage tank and, when the level of the catalyst slurry in the storage tank is below a predetermined level, the controller directs the catalyst slurry to the storage tank from the mixing tank.

6. The apparatus of claim 1, further comprising a pneumatic device upstream of the mixing tank, wherein the pneumatic device is adapted to provide a pneumatic gas to the mixing tank.

7. A polymerization apparatus comprising:
   a slurry polymerization reactor having a plurality of catalyst feeds;
   an agitated mixing tank for mixing a catalyst slurry comprising a solid catalyst in a liquid medium;
   a storage tank for maintaining the catalyst slurry, wherein the storage tank is fluidly connected to receive the catalyst slurry from the agitated mixing tank;
   a pump for delivering the catalyst slurry from the storage tank through a fluid passage to the a plurality of catalyst feeds of the polymerization reactor, wherein the plurality of catalyst feeds are spaced to facilitate even distribution of the solid catalyst through the polymerization reactor;
   a flow meter configured to measure the flow of the catalyst slurry into the reactor; and
   a controller that receives a flow signal from the flow meter indicative of the flow of the catalyst slurry, wherein the controller directs the pump to adjust the flow of the catalyst slurry into the polymerization reactor based on the flow signal.

8. An apparatus for monitoring and feeding a catalyst slurry, wherein the apparatus comprises:
   a storage tank for the catalyst slurry, the storage tank having disposed therein an agitator;
   a positive-displacement pump for delivering the catalyst slurry from the storage tank through a fluid passage;
   a flow meter that measures a flow of the catalyst slurry through the fluid passage; and
   a controller that receives a signal indicating the measured flow from the flow meter and signals the positive-displacement pump to adjust the flow of the catalyst slurry.

9. The apparatus of claim 8, wherein the controller calculates an amount of catalyst that has flowed over a unit of time through the fluid passage and signals the positive-displacement pump based on the calculated amount.

10. The apparatus of claim 8, further comprising a diluent feed fluidly connected to the fluid pump, such that the positive-displacement pump is capable of delivering a diluent rather than the catalyst slurry.

11. A polymerization apparatus comprising:
    a slurry polymerization reactor having at least one catalyst feed,
    a storage tank for the catalyst slurry, the storage tank having disposed therein an agitator;

a pump for delivering the catalyst slurry from the storage tank by a fluid passage to the at least one catalyst feed of the slurry polymerization reactor;

a flow meter that measures a flow of the catalyst slurry into the polymerization reactor; and a controller that receives a signal indicating the measured flow from the flow meter and signals the pump to adjust the flow of the catalyst slurry into the slurry polymerization reactor.

12. The polymerization apparatus of claim 11 wherein the slurry polymerization reactor has a plurality of catalyst feeds spaced to facilitate even distribution of the catalyst in the polymerization reactor.

13. An apparatus for preparing and continuously feeding a catalyst slurry to a polymerization reactor, wherein the apparatus comprises:

a first run tank having disposed therein an agitator and a level indicator;

a second run tank having disposed therein an agitator and a level indicator;

a pump fluidly connected to receive catalyst slurry from at least one of the first and second run tank and to provide catalyst slurry to the polymerization reactor; and a controller that receives signals from the level indicators and determines which run tank provides the catalyst slurry to the polymerization reactor.

14. The apparatus of claim 13, comprising an agitated mixing tank that mixes the catalyst slurry, the agitated mixing tank being fluidly connected without a ball check feeder valve to deliver the catalyst slurry to each of the run tanks.

15. The apparatus of claim 14, wherein the controller is adapted to determine which run tank receives the catalyst slurry from the agitated mixing tank.

16. The apparatus of claim 13, further comprising:

a fluid passage that extends from the pump to the polymerization reactor; and a flow meter adapted to measure the flow of the catalyst slurry into the polymerization reactor;

wherein the controller receives a signal indicating the measured flow from the flow meter and sends a signal to the pump to adjust the flow of the catalyst slurry into the polymerization reactor.

17. The apparatus of claim 1, wherein the storage tank does not receive the catalyst slurry from the mixing tank through a ball check feeder valve.

18. The apparatus of claim 7, wherein the storage tank does not receive the catalyst slurry from the agitated mixing tank through a ball check feeder valve, and does not provide catalyst slurry to the positive-displacement pump through a ball check feeder valve.

19. The apparatus of claim 8, wherein the storage tank does not receive catalyst through a ball check feeder valve.

20. The apparatus of claim 8, comprising an agitated mixing tank that mixes the catalyst slurry and is disposed upstream of the storage tank, wherein the agitated mixing tank provides the catalyst slurry to the storage tank.

21. The apparatus of claim 11, comprising an agitated mixing tank that mixes the catalyst slurry and is disposed upstream of the storage tank, wherein the storage tank receives the catalyst slurry from the agitated mixing tank.

* * * * *